United States Patent [19]
Matsumoto

[11] Patent Number: 5,369,672
[45] Date of Patent: Nov. 29, 1994

[54] INTERFACE CIRCUIT CAPABLE OF PERFORMING EXACT DATA TRANSFER

[75] Inventor: Yoshimi Matsumoto, Kanagawa, Japan

[73] Assignee: NEC Corporation

[21] Appl. No.: 929,261

[22] Filed: Aug. 13, 1992

[30] Foreign Application Priority Data

Aug. 23, 1991 [JP] Japan ................. 3-237362

[51] Int. Cl.$^5$ ............................................. H04L 7/00
[52] U.S. Cl. ................................... 375/106; 375/119
[58] Field of Search ............... 375/117, 106, 121, 118, 375/119; 370/48; 307/269, 602, 592; 328/63, 72

[56] References Cited

U.S. PATENT DOCUMENTS

| | | | |
|---|---|---|---|
| 4,380,736 | 4/1983 | Plaff | 375/117 |
| 4,935,942 | 6/1990 | Hwang et al. | 375/117 |
| 5,045,801 | 9/1991 | Mowery | 375/108 |

FOREIGN PATENT DOCUMENTS

60-180240  9/1985  Japan .

OTHER PUBLICATIONS

Patent Abstract of Japan, vol. 10, No. 20 (E-376) 25 Jan. 1986.

*Primary Examiner*—Stephen Chin
*Assistant Examiner*—Hai H. Phan
*Attorney, Agent, or Firm*—Laff, Whitesel, Conte & Saret

[57] ABSTRACT

An interface circuit capable of performing an exact data transfer between two devices operated by asynchronous two clocks of the same frequency even when the clock contains a jitter, including three-stage latches coupled by a cascade connection and a control circuit to output a one-shot pulse when one external clock and one internal clock are input. The first latch latches input data by the external clock, the second latch latches the data output from the first latch by the pulse of the control circuit, and the third latch latches the data output from the second latch by the internal clock and outputs the data. The input data are output from the third latch in the input order without a continuous or repeated output of the same data or an omission or deletion of the output data.

3 Claims, 5 Drawing Sheets

INTERFACE CIRCUIT CAPABLE OF PERFORMING EXACT DATA TRANSFER

BACKGROUND OF THE INVENTION

The present invention relates to an interface circuit, and more particularly to an interface circuit for performing data input and output between two devices operated by asynchronous two clocks such as internal and external clocks having the same frequency.

DESCRIPTION OF THE RELATED ARTS

In FIG. 1, there is shown a conventional input interface circuit for generally performing a data input by an external clock and a data output by an internal clock, which is comprised of a first latch 5 for latching input data by the external clock and a second latch 6 of a master/slave type for latching the data output from the first latch 5 by the internal clock. As described above, in almost all conventional input interface circuits, the data input in synchronism with the external clock are output in synchronism with the internal clock. In this case, when the external clock and the internal clock are overlapped with each other, the master/slave latch as the second latch 6 is used so that the data input to the first latch 5 may not be directly leaked out to the output of the second latch 6.

Next, the operation of the conventional input interface circuit described above will now be described in connection with FIG. 2. First, the input data A are latched in the first latch 5 by the external clock. Then, the data A output from the first latch 5 are latched in the second latch 6 by the internal clock, and the second latch 6 outputs the data A. Next, the input data B are latched in the first latch 5 by the external clock. Then, the data B output from the first latch 5 are latched in the second latch 6 by the internal clock, and the second latch 6 outputs the data B.

As described above, in the conventional input interface circuit shown in FIG. 1, the input data are consecutively latched from the first latch 5 to the second latch 6, and the data are output from the second latch 6. Hence, even when the external clock contains a jitter or the corresponding internal clock at the previous period, the input data can be successively output from the second latch 6 in synchronism with the internal clock.

However, in the conventional input interface circuit shown in FIG. 1, the following problems arise. That is, in case that the external clock contains the jitter with respect to the internal clock, as shown in FIG. 3, when two internal clocks are input to the second latch 6 while no external clock is input to the first latch 5, the second latch 6 latches the data A output from the first latch 5 before the input data A latched in the first latch 5 are renewed to the input data B, and thus the same data A are continuously output from the second latch 6.

Further, when two external clocks are input to the first latch 6 while two internal clocks are input to the second latch 6, the input data C are renewed to the input data D in the first latch 5 before the input data C latched in the first latch 5 are not latched in the second latch 6 yet, and then the data D latched in the first latch 5 are latched in the second latch 6. Accordingly, the second latch 6 can not output the data C. That is, in this case, an omission or deletion occurs in the output data with respect to the input data.

SUMMARY OF THE INVENTION

It is therefore an object of the present invention to provide an interface circuit in view of the aforementioned problems of the prior art, which is capable of performing an exact data transfer between two devices operated by asynchronous two clocks without any disadvantages such as an omission or deletion of data, a continuous or repeated output of the same data and the like even when asynchronous two clocks having the same frequency contain a jitter.

In accordance with one aspect of the present invention, there is provided an interface circuit for performing a data transfer between a first device operated by a first clock signal and a second device operated by an asynchronous second clock signal having the same frequency as the first clock signal, comprising control circuit means for generating a one-shot pulse within a period of the second clock signal whenever one first clock signal and one second clock signal are input; first latch means for latching data input to the interface circuit by the first clock signal; second latch means for latching the data output from the first latch means by the one-shot pulse generated by the control circuit means; and third latch means for latching the data output from the second latch means by the second clock signal, the input data being successively output from the interface circuit in synchronism with the second clock signal.

According to the present invention, the first latch means latches the input data by the first clock signal, the second latch means latches the data output from the first latch means by the pulse generated from the control circuit means by the second clock signal, the third latch means latches the data output from the second latch means by the next second clock signal and outputs the data. As described above, the first, second and third latch means successively latch the data and the third latch means outputs the data. Further, even when the next first clock signal is not input within the period of the second clock signal by a presence of a jitter in the first clock signal after the first clock signal is input, the pulse is output from the control circuit means at the time when the next first clock signal is input, and the second latch means latches the data output from the first latch means. Hence, the second latch means can exactly latch the input data in the input order, and the third latch means can latch the data output from the second latch means by the next second clock signal and outputs the data. Therefore, the input data are output from the interface circuit in the input order, and the continuous or repeated output of the same data and the omission or deletion of the output data can not be caused.

BRIEF DESCRIPTION OF THE DRAWINGS

The objects, features and advantages of the present invention will become more apparent from the consideration of the following detailed description, taken in conjunction with the accompanying drawings, in which.

DESCRIPTION OF THE PREFERRED EMBODIMENTS

Figure 1:
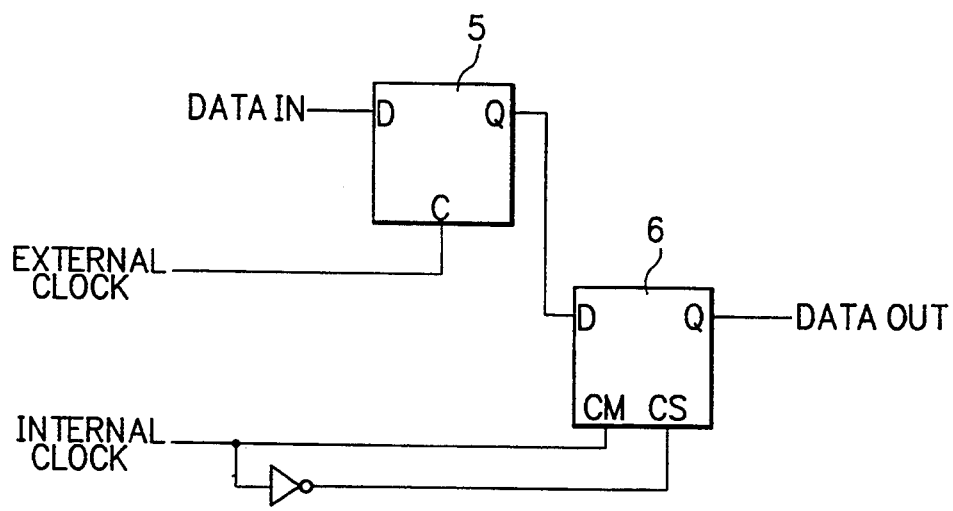
FIG. 1 is a block diagram of a conventional input interface circuit.
Figure 2:
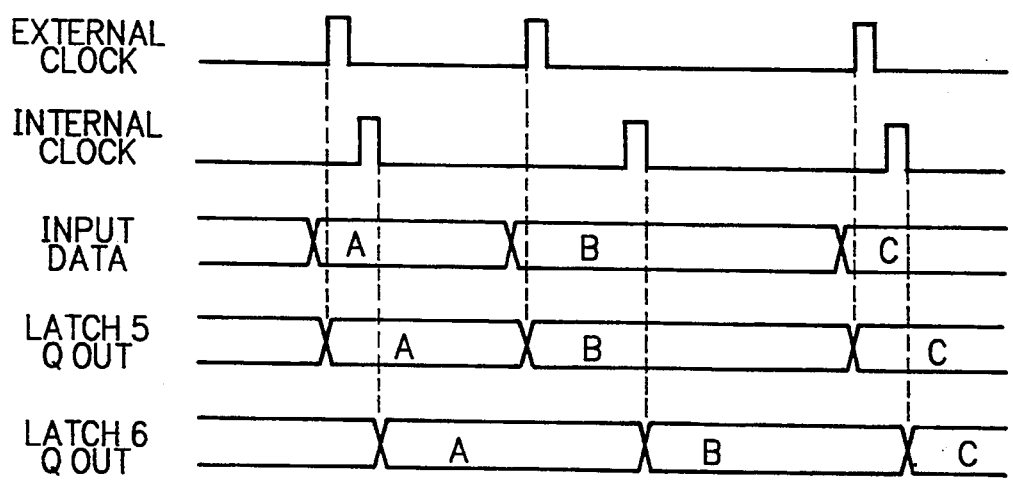
FIG. 2 is a timing chart exhibiting an operation of the input interface circuit shown in FIG. 1.
Figure 3:
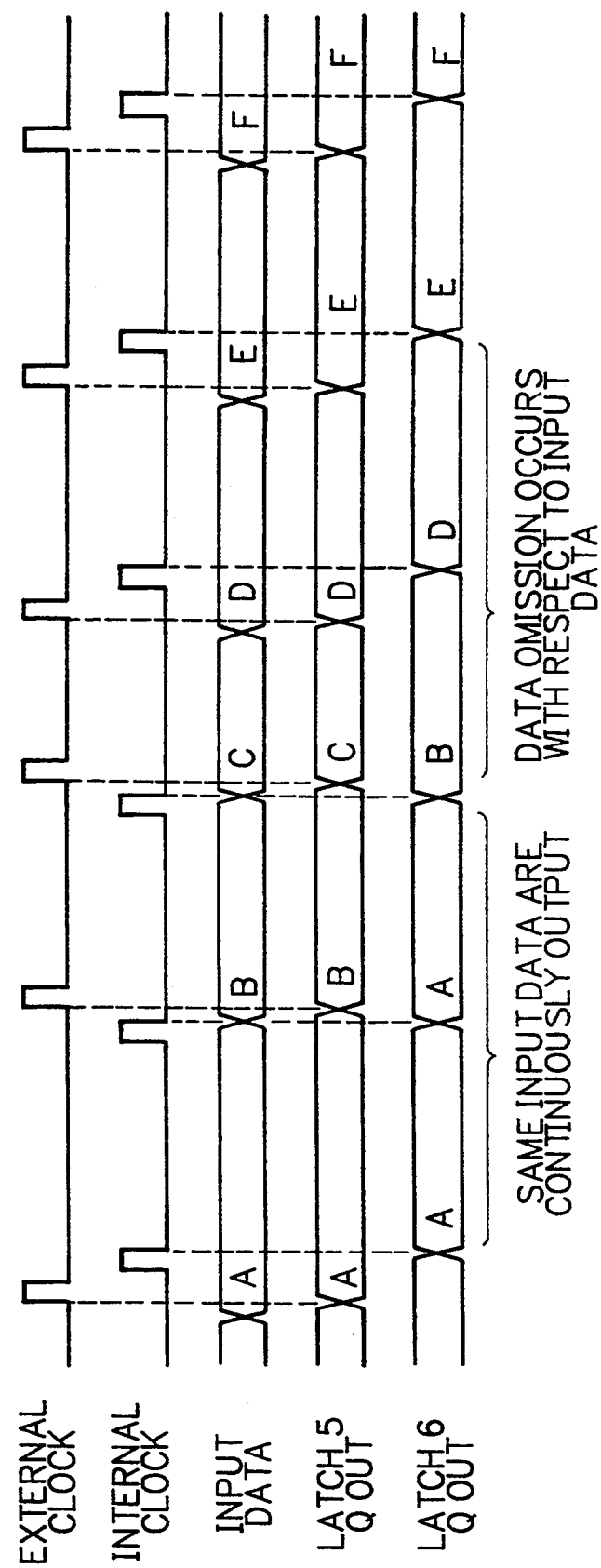
FIG. 3 is a timing chart exhibiting an operation of the input interface circuit shown in FIG. 1 when an external clock contains a jitter.
Figure 4:
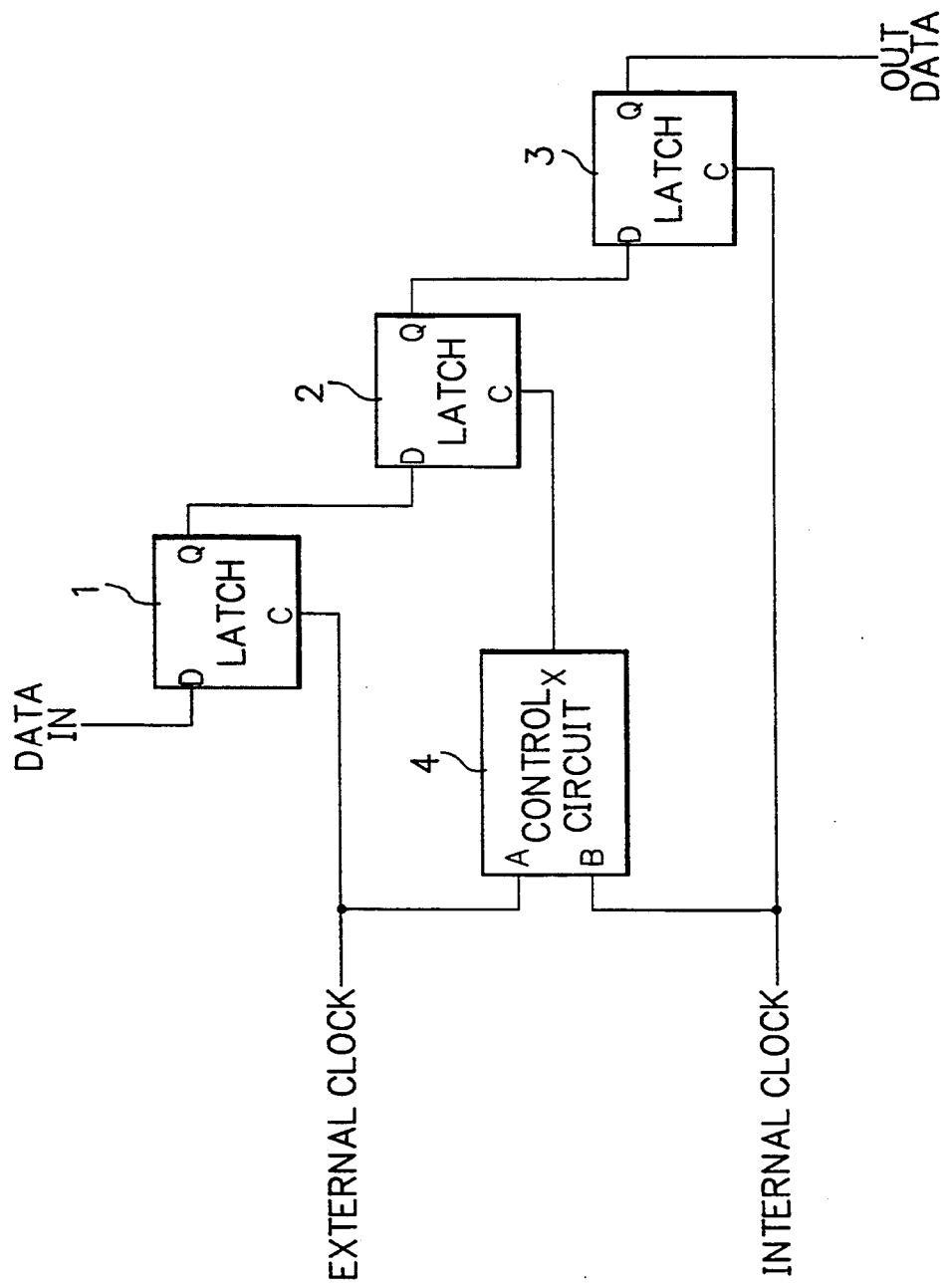
FIG. 4 is a block diagram of one embodiment of an input interface circuit according to the present invention.

Referring now to the drawings, wherein like reference characters designate like or corresponding parts throughout the views and thus the repeated description thereof can be omitted for brevity, there is shown in FIG. 4 one embodiment of an input interface circuit according to the present invention.

As shown in FIG. 4, the input interface circuit comprises a first latch 1 for latching input data by an external clock, a second latch 2 for latching the data output from the first latch 1 by an output signal of a control circuit 4, and a third latch 3 for latching the data output from the second latch 2 by an internal clock. In this embodiment, the input and output terminals of the adjacent two of the first, second and third latches 1, 2 and 3 are coupled with each other by a cascade connection. The control circuit 4 outputs a one-shot pulse within the period of the internal clock whenever one external clock and one internal clock are input.

Figure 5:
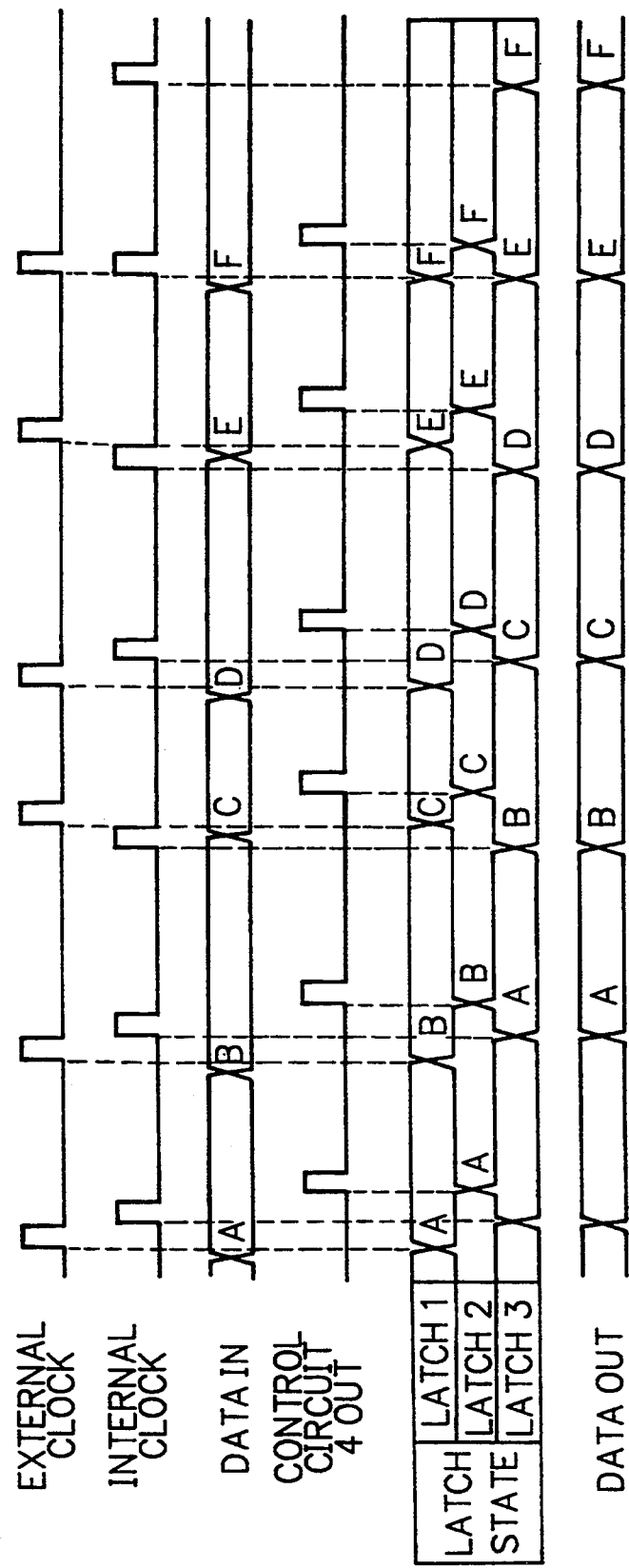
FIG. 5 is a timing chart exhibiting an operation of the input interface circuit shown in FIG. 4.

FIG. 5 shows one example of a timing chart of an operation of the interface circuit shown in FIG. 4. The operation of the interface circuit described above will now be described in detail with reference to FIG. 5.

First, the input data A are latched in the first latch 1 by the external clock, and the data A output from the first latch 1 are latched in the second latch 2 by the output signal of the control circuit 4. Then, when the internal clock is input to the third latch 3, the data A output from the second latch 2 are latched in the third latch 3, and the third latch 3 outputs the data A.

At this time, since the next external clock is already input to the first latch 1, the input data B are latched in the first latch 1. Then, the second latch 2 latches the data B output from the first latch 1 by the output signal of the control circuit 4, and the third latch 3 latches the data B output from the second latch 2 by the next internal clock and outputs the data B.

Now, the case where the external clock contains a jitter with respect to the internal clock will be described. First, as shown at a period between the second and third pulses of the internal clock in FIG. 5, when two internal clocks (the second and third pulses) are continuously input to the third latch 3 and the control circuit 4 after the external clock (the second pulse) is input to the first latch 1 and the control circuit 4, the first latch 1 already latched the input data B by the external clock (the second pulse) and the second latch 2 latches the data B output from the first latch 1 by the output signal (the second pulse) generated by the control circuit 4 when the internal clock (the second pulse) is input to the control circuit 4. Hence, after the data A are output from the third latch 3 by the internal clock (the second pulse), the internal clock (the third pulse) is further input to the third latch 3, and the third latch 3 can latch the data B output from the second latch 2 and outputs the data B.

Next, as shown at a period between the third and fourth pulses of the external clock in FIG. 5, when two external clocks (the third and fourth pulses) are continuously input to the first latch 1 and the control circuit 4 after the internal clock (the third pulse) is input to the third latch 3 and the control circuit 4, the first latch 1 latches the input data C by the external clock (the third pulse) and the second latch 2 latches the data C output from the first latch 1 by the output signal (the third pulse) of the control circuit 4. Further, when the external clock (the fourth pulse) is input to the first latch 1 and the control circuit 4, the first latch 1 latches the input data D, and then the second latch 2 latches the data D output from the first latch 1 by the output signal (the fourth pulse) generated by the control circuit 4 when the internal clock (the fourth pulse) is input to the control circuit 4. Hence, after the data C are output from the third latch 3 by the internal clock (the fourth pulse), the third latch 3 can latch the data D output from the second latch 2 by the internal clock (the fifth pulse) and outputs the data D.

As described above, in this embodiment, even when the external clock contains the jitter of the corresponding internal clock at the previous or following period, the input data can be successively latched in the first, second and third latches 1, 2 and 3, and thus the data can be output in the input order. Hence, the same data can not be continuously or repeatedly output from the input interface circuit, and no omission or deletion occurs in the output data with respect to the input data.

Figure 6:
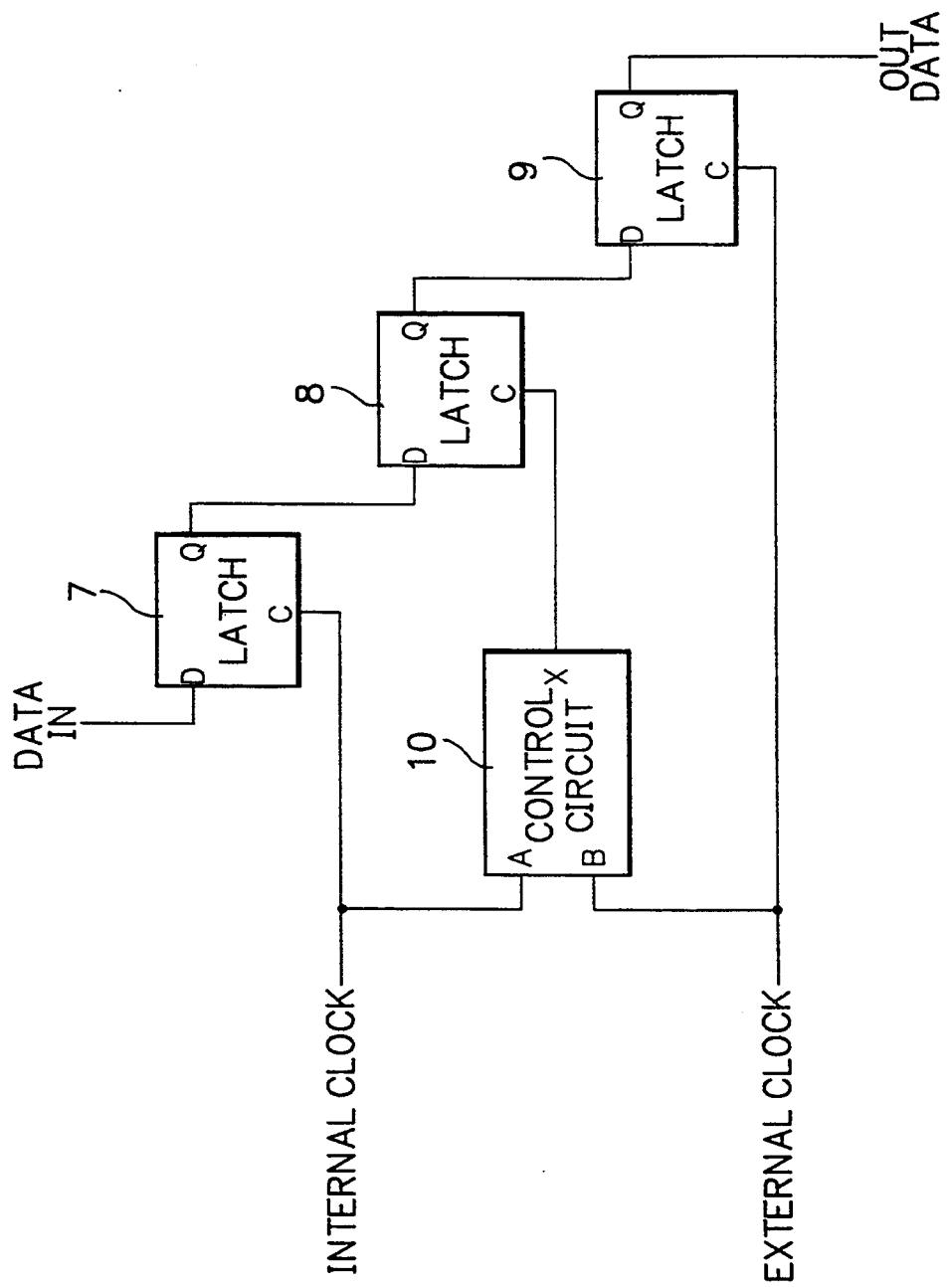
FIG. 6 is a block diagram of one embodiment of an output interface circuit according to the present invention.

In FIG. 6, there is shown one embodiment of an output interface circuit according to the present invention. As shown in FIG. 6, the output interface circuit comprises a first latch 7 for latching output data by an internal clock, a second latch 8 for latching the data output from the first latch 7 by an output signal of a control circuit 10, and a third latch 9 for latching the data output from the second latch 8 by an external clock. In this embodiment, the input and output terminals of the adjacent two of the first, second and third latches 7, 8 and 9 are coupled with each other by a cascade connection. The control circuit 10 outputs a one-shot pulse within the period of the external clock whenever one external clock and one internal clock are input.

In this embodiment, by replacing the internal clock with the external clock in the input interface circuit described above, an output interface circuit can be obtained. The operation of this output interface circuit can be performed in the same manner as the input interface circuit. Hence, the input data latched in the first latch 7 by the internal clock can be consecutively latched in the second latch 8 and the third latch 9, and the third latch 9 outputs the data. In this case, a continuous or repeated output of the same data from the output interface circuit, and an occurrence of an omission or deletion of the output data with respect to the input data can be prevented in the same manner as the input interface circuit.

As described above, according to the present invention, in the three-stage cascade connection latches, the control circuit controls so that the second latch may latch the data latched in the first latch before the first latch latches the next data and similarly the third latch may latch the data latched in the second latch before the second latch latches the next data so as to output the data in the input order, without outputting the continuous or repeated same data and occurring the omission or deletion of the output data with respect to the input data. Hence, in the interface circuit according to the present invention, even when the external clock contains the jitter of the corresponding internal clock at the previous or following period, an exact data transfer can be performed, and an malfunction due to the jitter can be prevented.

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

What is claimed is:

1. An interface circuit for performing a data transfer between a first device operated responsive to a first clock signal and a second device operated responsive to an asynchronous second clock signal having the same frequency as the first clock signal, said interface circuit comprising:

control circuit means for generating a one-shot pulse within a period of a second clock signal whenever both one first clock signal and one second clock signal are input;

first latch means for latching data inputted to the interface circuit in response to the first clock signal, second latch means for latching the data outputted from the first latch means in response to the one-shot pulse generated by the control circuit means; and third latch means for latching the data outputted from the second latch means in response to the second clock signal, the inputs and outputs of the first, second and third latch means being connected in cascade;

the first clock signal being one of either the external clock signal or the internal clock signal;

the second clock signal being the other of the external clock signal and the internal clock signal; and the interface circuit outputting the output signal of the third latch means synchronously with the second clock signal, and outputting data responsive to the input data even when jitter occurs in the first and second clock signals.

2. The interface circuit as claimed in claim 1, wherein the interface circuit is an input interface circuit, and the first and second clock signals are external and internal clock signals, respectively.

3. The interface circuit as claimed in claim 1, wherein the interface circuit is an output interface circuit, and the first and second clock signals are internal and external clock signals, respectively.

* * * * *